United States Patent
Lisitsa et al.

(10) Patent No.: US 6,658,477 B1
(45) Date of Patent: *Dec. 2, 2003

(54) IMPROVING THE CONTROL OF STREAMING DATA THROUGH MULTIPLE PROCESSING MODULES

(75) Inventors: Rafael S. Lisitsa, Bellevue, WA (US); Dale A. Sather, Seattle, WA (US); George H. J. Shaw, Woodinville, WA (US); Bryan A. Woodruff, North Bend, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,597

(22) Filed: May 12, 1999

(51) Int. Cl.⁷ .......................... G06F 15/16; G06F 13/10
(52) U.S. Cl. ........................ 709/231; 709/321
(58) Field of Search ................ 370/412, 253; 709/231, 327, 322; 710/253; 712/35; 348/14

(56) References Cited

U.S. PATENT DOCUMENTS

| | | | | |
|---|---|---|---|---|
| 5,608,651 A | * | 3/1997 | Leavy et al. | 348/14.12 |
| 5,623,483 A | * | 4/1997 | Agrawal et al. | 370/253 |
| 5,625,845 A | * | 4/1997 | Allran et al. | 709/322 |
| 5,758,086 A | * | 5/1998 | Maegawa | 709/231 |
| 5,815,689 A | * | 9/1998 | Shaw et al. | 713/400 |
| 5,872,993 A | * | 2/1999 | Brown | 712/35 |
| 5,909,595 A | * | 6/1999 | Rosenthal et al. | 710/38 |
| 5,913,038 A | * | 6/1999 | Griffiths | 709/231 |
| 6,012,136 A | * | 1/2000 | Brown | 712/35 |
| 6,029,239 A | * | 2/2000 | Brown | 712/1 |
| 6,128,307 A | * | 10/2000 | Brown | 370/412 |
| 6,205,492 B1 | * | 3/2001 | Shaw et al. | 709/321 |
| 6,209,041 B1 | * | 3/2001 | Shaw et al. | 709/321 |
| 6,212,574 B1 | * | 4/2001 | O'Rourke et al. | 709/321 |
| 6,278,478 B1 | * | 8/2001 | Ferriere | 348/14.1 |
| 6,340,997 B1 | * | 1/2002 | Borseth | 348/731 |

FOREIGN PATENT DOCUMENTS

| | | |
|---|---|---|
| EP | 0 550 196 | 7/1993 |
| EP | 0 847 191 | 6/1998 |
| WO | WO 97 50242 | 12/1997 |

OTHER PUBLICATIONS

Saravan Kumar KB. WDM Vido Streaming Filter Driver. Nov. 26, 1999. California Software Company Limited. p. 1–32.*

(List continued on next page.)

*Primary Examiner*—Ayaz Sheikh
*Assistant Examiner*—Christian La Forgia
(74) *Attorney, Agent, or Firm*—Leydig, Voit & Mayer, Ltd.

(57) ABSTRACT

Frame-based streaming data is controlled through a reconfigurable graph of processing modules. A control mechanism employs a set of components that are used and combined among themselves to implement control functions at the control pins of processing modules. The components include a source pin and a sink pin for connecting modules together, a queue for making data frames available to module functions, a data-frame requester, and a splitter for handling graph branches. When modules are assembled into a graph, a control manager implements their control operations as combinations of the above components, then examines all of the components in a graph control structure to determine whether any can be removed as unnecessary to the overall operation of the structure. If so, the remaining components are connected directly to each other. When the graph is played, control packets traverse the simplified structure, carrying with them associated frames of data for processing by the modules.

37 Claims, 6 Drawing Sheets

OTHER PUBLICATIONS

Connell, Edward V. et al.: "Combinative Interactions of a Human Immunodeficiency Virus (HIV) Tat Antagonist with HIV Reverse Transcriptase Inhibitors and an HIV Protease Inhibitor", Antimicrobial Agents and Chemotherapy, Feb. 1, 1994, pp. 348–352, XP 000654722.

Rubine, Dean et al.: "Low–Latency Interaction Through Choice–Points, Buffering, and Cuts in Tactus", Proceedings of the International Conference on Multimedia Computing and Systems, May 14–19, 1994, XP 000541903.

Horn, F.: "On Programming and Supporting Multimedia Object Synchronization", Computer Journal, Oxford University Press, vol. 36, No. 1, 1993, pp. 4–18, XP 000360261.

Ravindran, K. and Bansal, Vivek: "Delay Compensation Protocols for Synchronization of Multimedia Data Streams", IEEE Transactions on Knowledge and Data Engineering, vol. 5, No. 4, Aug. 4, 1993, pp. 574–589, XP 002162224.

\* cited by examiner

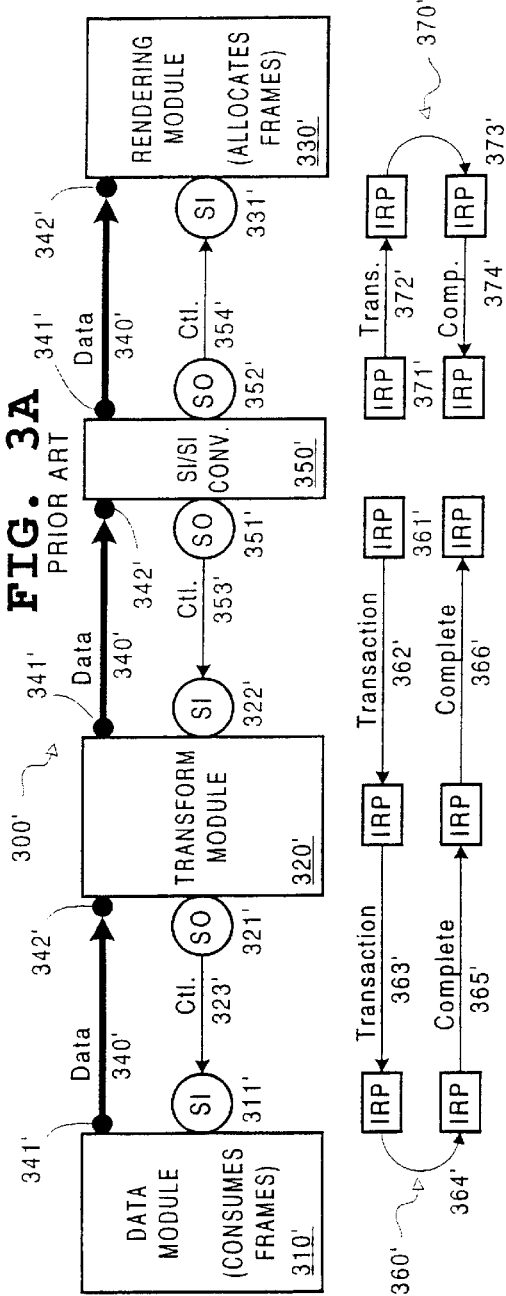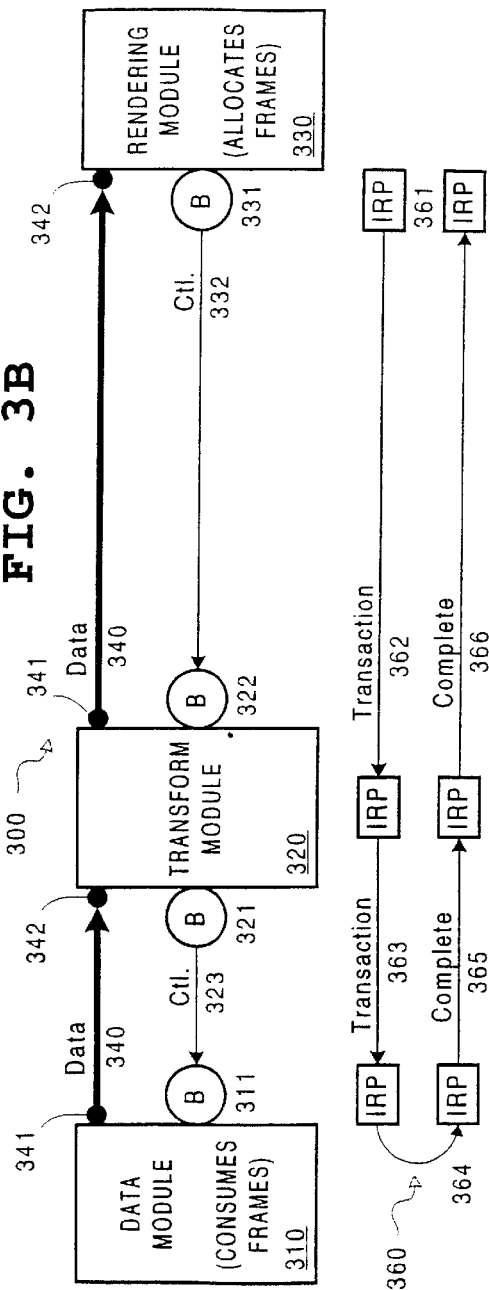

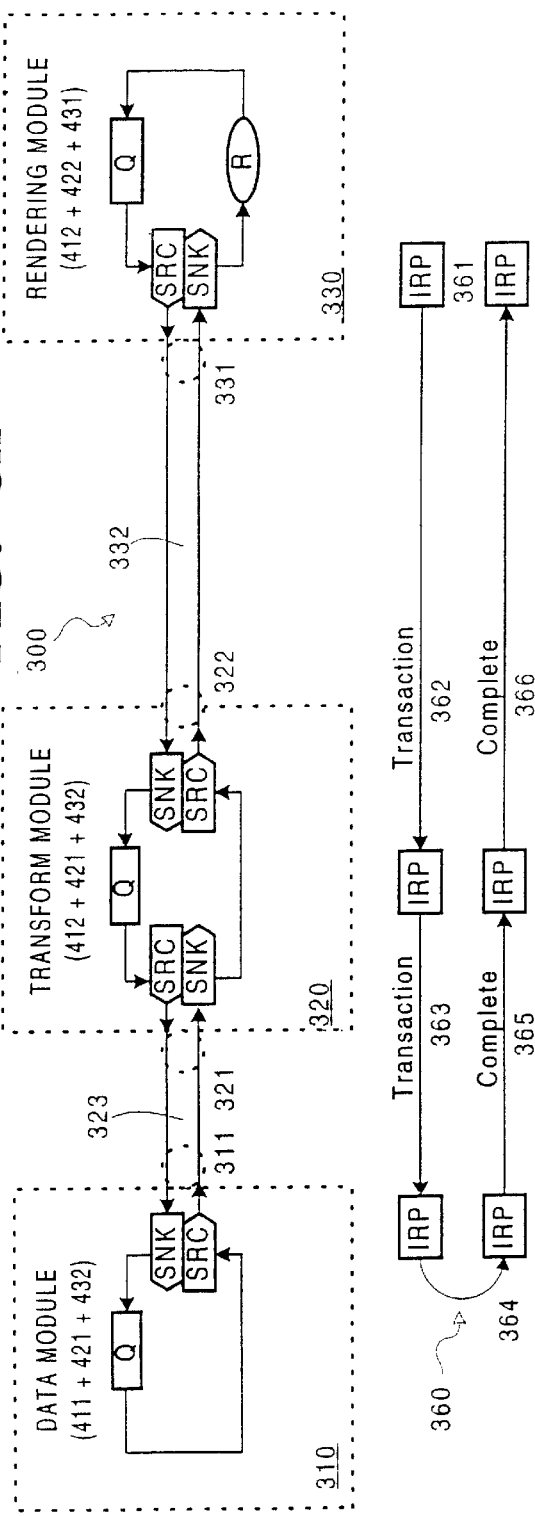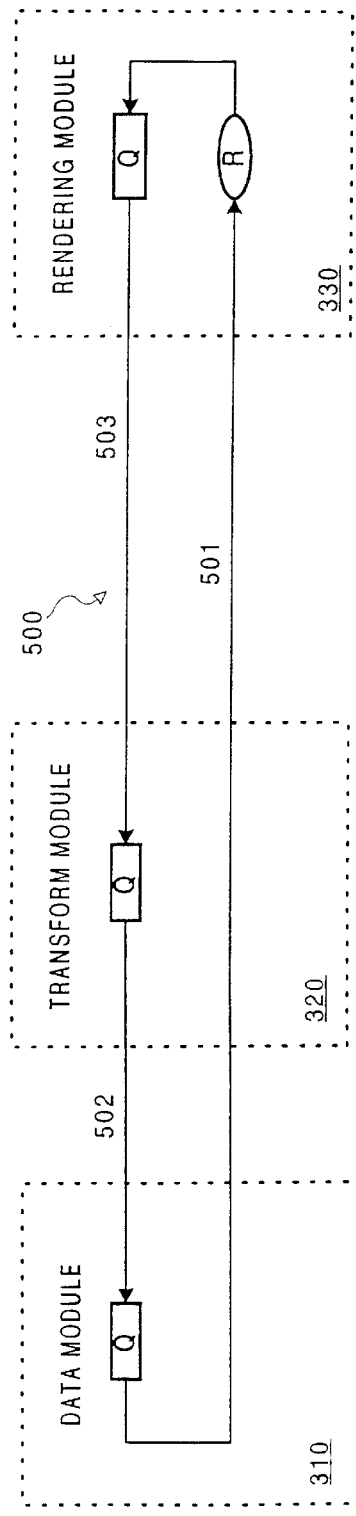

IMPROVING THE CONTROL OF STREAMING DATA THROUGH MULTIPLE PROCESSING MODULES

FIELD OF THE INVENTION

The Present invention relates to electronic data processing, and more specifically concerns managing the flow of streaming data through multiple hardware and/or software processing modules in a computer.

BACKGROUND OF THE INVENTION

Streaming data is a continuous flow of data that must be ultimately presented to a user in a particular sequence in real time. Digital samples representing an audio signal, for example, must be converted to a sound wave in the same sequence they were transmitted, and at exactly the time spacing they were generated, or some user-specified alternative. Digital data representing video frames require assembly into the proper sequence in the frame for presentation on a display together, and successive frames must display at the correct real-time rate.

Streaming data need not necessarily maintain correct sequence or timing throughout an entire communication chain among various transmitters, processors, memories, and receivers. Indeed, video and audio clips are frequently stored as static data in recording media, computer memory, and network buffers. Packet-switched systems might also carry parts of the same streaming data over different paths and even in different time sequences. Processors such as digital filters can assemble parts of the data stream, modify them as a static unit, then release them to further units in the system. Eventually, however, the stream must be heard or seen in the correct sequence at the proper relative times.

Streaming data almost always involves very large amounts of data. Streaming data almost always challenges the capacity of digital buses in computers to access it, carry it and switch it. Streaming data almost always taxes the processing power of functional units, both software and hardware, to receive it, convert it, and pass it on to other units. Those in the art speak of the necessity of "fat pipes" for streaming data.

An abstract model has been developed to represent the connections among various facilities in a computer that are required to process a given type of streaming data. For example, a video clip might require MPEG decoding in a dedicated chip, rasterizing the video fields in another hardware module, digital filtering of the audio in a software module, insertion of subtitles by another software module, D/A conversion of the video in a video adapter card, and D/A conversion of the audio in a separate audio card. A number of different types of memory in different locations can store the data between successive operations, and a number of buses can be made available to transport the data.

An architecture called WDM-CSA (Windows Driver Model Connection and Streaming Architecture) introduces the concept of a graph for specifying the connections among the facilities of a computer where a data stream must pass through a number of processing units in an efficient manner. The WDM-CSA protocol also simplifies the development of drivers for such data. Basically, WDM-CSA specifies the flow of data frames through a graph, and also the control protocols by which adjacent modules in the graph communicate with each other to request and accept the data frames.

Commonly assigned patent application Ser. No. 09/310,610 "Improving the Flow of Streaming Data through Multiple Processing Units," filed on even date herewith, introduces the concept of data pipes for enhancing the efficiency of transporting data frames through a graph of interconnected modules in WDM-CSA and in other streaming-data environments. That application is incorporated herein by reference. Basically, data pipes avoid redundant storage and copying of data as a number of modules process the frames, and streamline allocation of the frames in which the data is packaged.

However, further inefficiencies occur in conventional control protocols for managing the transport of streaming data through multiple hardware and/or software modules interconnected in pipes, graphs, and similar arrangements.

The simplest and fastest method of controlling such data is a dedicated protocol for transporting frames in a hard-wired, unchanging configuration of modules. This option is not practical for environments such as a personal computer or multimedia system capable of receiving many different kinds of streaming data in multiple formats, especially where a number of manufacturers provide the individual modules. Also, of course, introduction of new data types and new modules would require upgrading an entire system, rather than substituting components individually.

The other extreme is a one-size-fits-all protocol capable of handling a broad spectrum of data types and formats, and a wide range of modules. A number of computer operating systems provide this kind of protocol. The Windows® 2000 operating system from Microsoft Corp., for example, incorporates an I/O Manager subsystem that accommodates the connection of multiple driver and filter modules in a chain between a data source and a data sink. This protocol is very flexible, and works reliably with a variety of data types, including streaming data. But flexibility almost always sacrifices speed. The very features that permit broad applicability often lead to redundancy and lower efficiency in particular situations.

Streaming data does require high speed and efficient control. The use of multiple reconfigurable modules also requires flexibility. Conventional control of streaming data has maximized one of these goals to the derogation of the other. This important emerging technology requires an improved control mechanism that achieves the very efficient control of a dedicated protocol, and yet allows enough flexibility for different data types, different modules, and different configurations in the environment of streaming data transported in frames through multiple processing modules.

SUMMARY OF THE INVENTION

The present invention proposes a mechanism for controlling the flow of streaming data packaged in frames or similar units through a graph or network of multiple processing modules. The mechanism improves the speed and efficiency of general-purpose mechanisms, while retaining the flexibility to accommodate many different kinds of data, data packages, and processing modules, and to permit the interconnection of those modules into arbitrary graphs or other configurations for achieving overall operations upon the streaming data.

The proposed mechanism is conceptually uncomplicated, and in fact can simplify the design of modules that incorporate it, in many cases. The mechanism coexists with conventional protocols, and permits their use for other kinds of data in other applications.

Basically, the mechanism employs a set of components that can be used and combined among themselves to implement control functions at the control pins of processing modules. The components can include a source pin, a sink pin, a queue, a requestor, and an optional splitter.

When the components are defined and implemented as control pins in a number of hardware and/or software modules, the control pins of the modules are selected and connected together to form a desired graph for processing the streaming data. Although the control pins perform more or less standard functions when viewed from outside the modules, the interconnections in a specific graph frequently reveal redundant or superfluous internal functions as between adjacent modules in that graph. In these cases, the invention bypasses the connected control pins so as to remove the unnecessary functions, and connects the internal mechanism components to each other directly. In this way, control packets for frames of the streaming data can be transported through the graph more efficiently.

BRIEF DESCRIPTION OF THE DRAWING

FIG. 3, comprising FIGS. 3A and 3B, is a diagram of a typical streaming-data graph of the prior art and as simplified by one aspect of the invention.

FIG. 4, comprising

FIG. 5, comprising FIGS. 5A and 5B, shows removal of functions from the example graph of FIG. 3B

DETAILED DESCRIPTION

The following detailed description of preferred embodiments refers to the accompanying drawings that form a part hereof, and shows by way of illustration specific embodiments of the present invention. These embodiments are described in sufficient detail to enable those skilled in the art to practice the invention. Structural, logical, and procedural modifications within the spirit and scope of the invention will occur to those in the art. The following description is therefore not to be taken in a limiting sense, and the scope of the inventions is defined only by the appended claims.

Operating Environment

Figure 1:
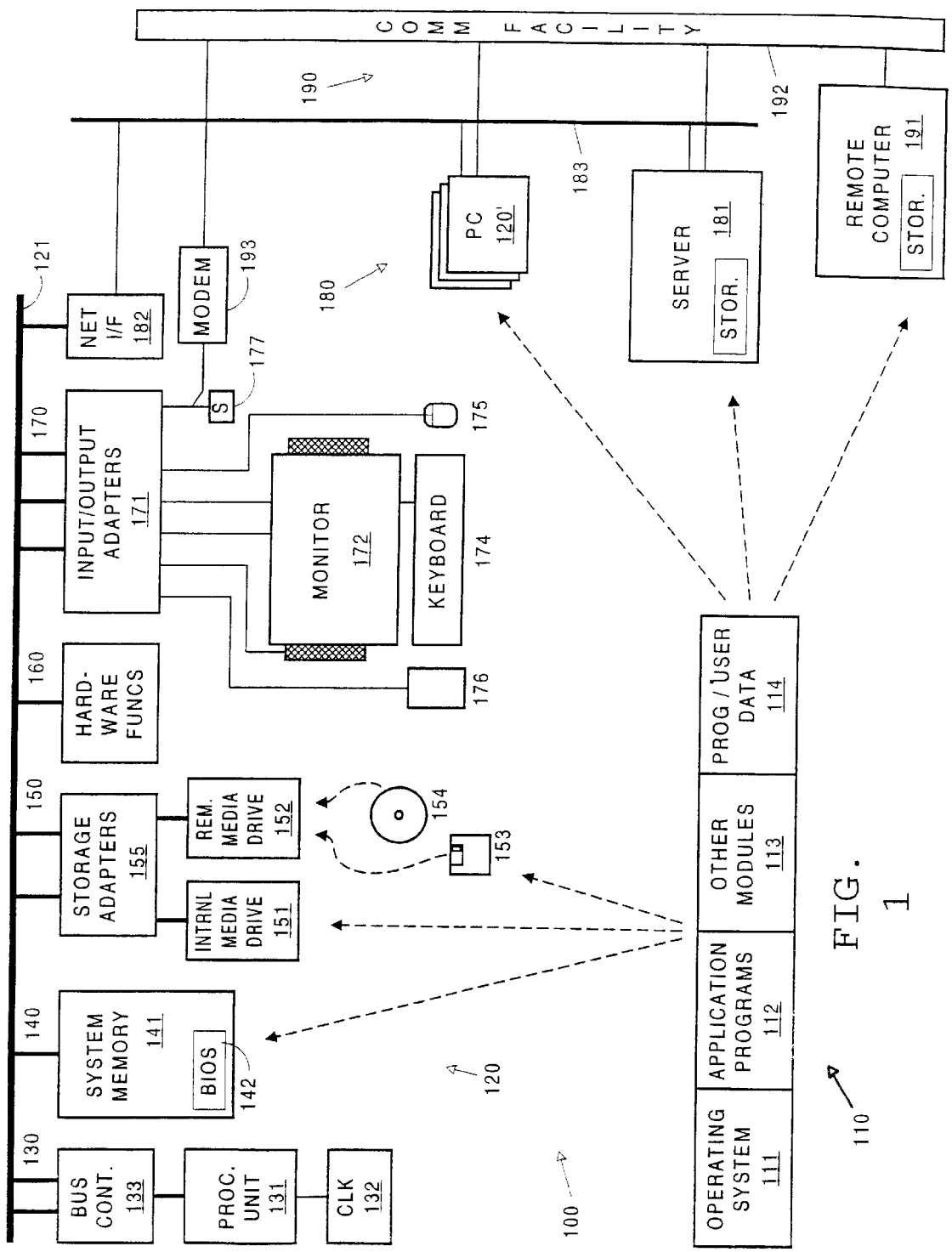
FIG. 1 is a block diagram of an illustrative environment for the present invention.

FIG. 1 is a high-level diagram of an illustrative environment 100 in which the invention is implemented as executable instructions, data, and/or hardware on a programmable general-purpose computer such as personal computer (PC) 120. Other suitable environments, and variations of the described environment, will occur to those skilled in the art. A conventional PC 120 typically comprises a number of components coupled together by one or more system buses 121 for carrying instructions, data, and various control signals. These buses may assume a number of forms, such as the conventional ISA, PCI, and AGP buses. Some or all of the units coupled to a bus can act as a bus master for initiating transfers to other units. Processing unit 130 may have one or more microprocessors 131 driven by system clock 132 and coupled to one or more buses 121 by controllers 133. Internal memory system 140 supplies instructions and data to processing unit 130. High-speed RAM 141 stores any or all of the elements of software 110. ROM 142 commonly stores basic input/output system (BIOS) software for starting PC 120 and for controlling low-level operations among its components. Bulk storage subsystem 150 stores one or more elements of software 110. Hard disk drive 151 stores software 110 in a nonvolatile form. Drives 152 read and write software on removable media such as magnetic diskette 153 and optical disc 154. Other technologies for bulk storage are also known in the art. Adapters 155 couple the storage devices to system buses 121, and sometimes to each other directly. Other hardware units and adapters, indicated generally at 160, may perform specialized functions such as data encryption, signal processing, and the like, under the control of the processor or another unit on the buses.

Input/output (I/O) subsystem 170 has a number of specialized adapters 171 for connecting PC 120 to external devices for interfacing with a user. A monitor 172 creates a visual display of graphic data in any of several known forms. Speakers 173 output audio data that may arrive at an adapter 171 as digital wave samples, musical-instrument digital interface (MIDI) streams, or other formats. Keyboard 174 accepts keystrokes from the user. A mouse or other pointing device 175 indicates where a user action is to occur. Block 176 represents other input and/or output devices, such as a small camera or microphone for converting video and audio input signals into digital data. Other input and output devices, such as printers and scanners commonly connect to standardized ports 177. These ports include parallel, serial, SCSI, USB, FireWire, and other conventional forms.

Personal computers frequently connect to other computers in networks. For example, local area network (LAN) 180 connect PC 120 to other PCs 120' and/or to remote servers 181 through a network adapter 182 in PC 120, using a standard protocol such as Ethernet or token-ring. Although FIG. 1 shows a physical cable 183 for interconnecting the LAN, wireless, optical, and other technologies are also available. Other networks, such as wide-area network (WAN) 190 can also interconnect PCs 120 and 120', and even servers 181, to remote computers 191. FIG. 1 illustrates a communications facility 192 such as a public switched telephone network for a WAN 190 such as the internet. PC 120 can employ an internal or external modem 193 coupled to serial port 177; however, other known technologies such as ISDN, asynchronous transfer mode (ATM), frame-relay, and others are becoming more widespread. In a networked or distributed-computing environment, some of the software 110 may be stored on the other peer PCs 120', or on computers 181 and 191, each of which has its own storage devices and media.

Software elements 110 may be divided into a number of types, whose designations overlap to some degree. For example, the previously mentioned BIOS sometimes includes high-level routines or programs which might also be classified as part of an operating system (OS) in other settings. The major purpose of OS 111 is to provide a software environment for executing application programs 112. An OS such as Windows® from Microsoft Corp. commonly implements high-level application-program interfaces (APIs), file systems, communications protocols, input/output data conversions, and other functions. It also maintains computer resources and oversees the execution of various programs. Application programs 112 perform more direct functions for the user. The user normally calls them explicitly, although they can execute implicitly in connection with other applications or by association with particular data files or types. Modules 113 are packages of executable instructions and data which may perform functions for OSs 111 or for applications 112. These might take the form of dynamic link libraries (.dll). Finally, data files 114 include collections of non-executable data such as text documents, databases, and media such as graphics images and sound recordings. Again, the above categories of software 110 are neither exhaustive nor mutually exclusive.

Figure 2:
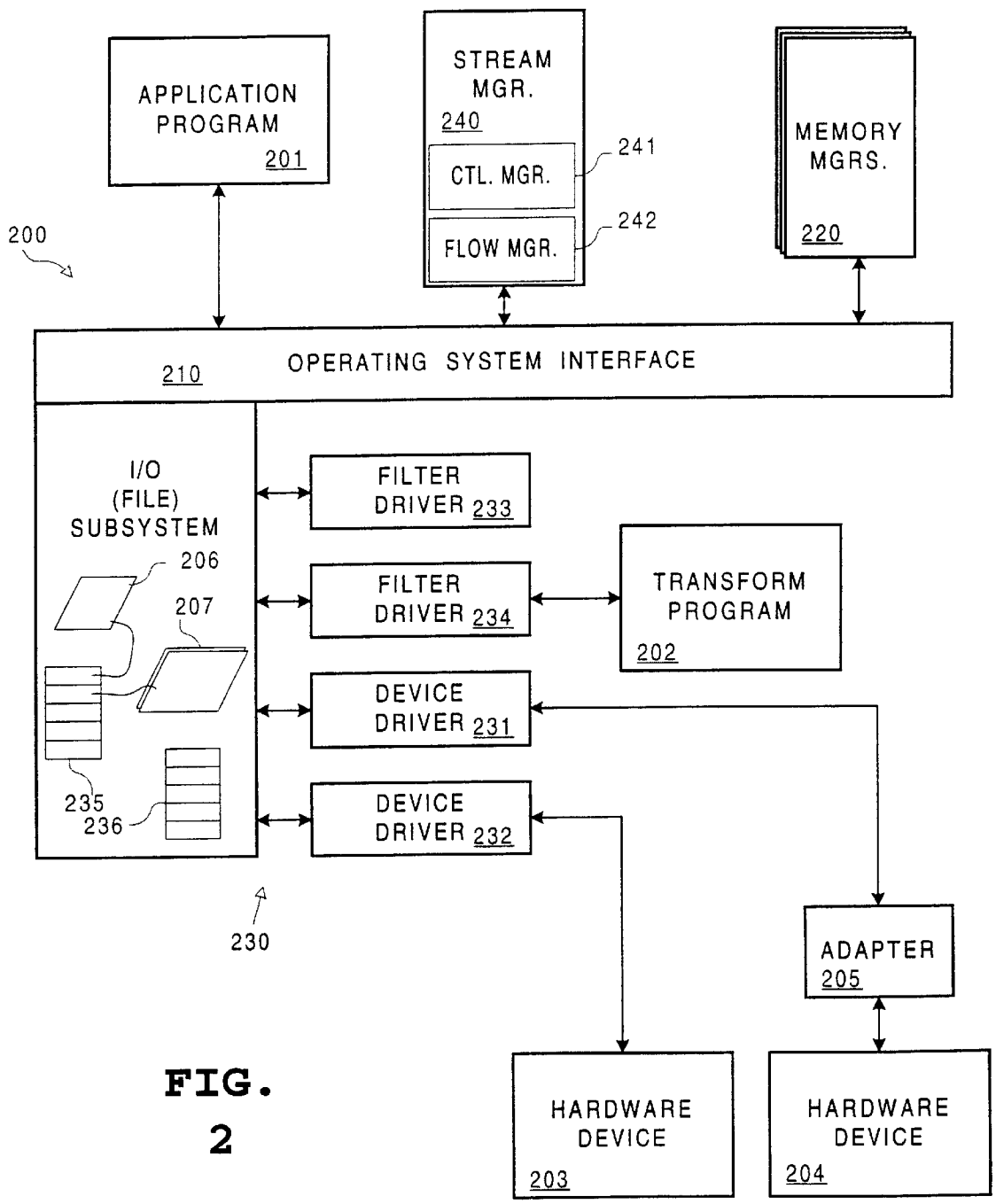
FIG. 2 shows relevant portions of an operating system for hosting the invention.

FIG. 2 shows the relevant components 200 of an illustrative operating system, the Microsoft® Windows2000® OS. Interface component 210 communicates with other components and with software such as application programs 201 outside the OS. Application program 201 might be, for example, a viewer utility by which a user selects certain streaming data for presentation.

Physical memories in system 100, FIG. 1, have memory manager components 220 for organizing the data stored in them. For example, an allocator might specify frame size, data type, and other characteristics of the data stored in a memory module 140, FIG. 1. A single physical memory module can have multiple managers for organizing different data at different times or in different parts of the module. A single manager can also serve multiple physical memories. The significant function of managers 220 in the present context is to allocate and deallocate blocks of memory for storing frames or other units of streaming data. For this reason, managers 220 will frequently be referred to as memory allocators. A frame is allocated whenever newly arriving data requests it; alternatively, it can be pre-allocated. The frame carries the data through one or more filters in a path, and is deallocated when all filters in the path have finished processing that data. Frames can be destroyed, but are usually recycled with further new data arriving in the path.

In Windows2000, an I/O subsystem 230 supervises both file storage and other input/output devices and facilities. Requests for file or I/O services are routed between an application program or other source and hardware devices such as 203 and 204 via one or more layers of device drivers such as 231 and 232. Device 203 might be a hardware module such as a memory or an MPEG-2 decoder. Device 203 might represent an off-line storage device such as a DVD player or a cable TV, with its hardware interface adapter 205. Along the way, filter drivers such as 233 and 234 can intercept data, file handles, and other information, based upon certain characteristics or events. Filter drivers can process data internally as shown at 233. They can also pass information back and forth to programs such as 202, which can be located within the OS kernel layer or at any other point in the software architecture of system 100. Components can be dedicated to a single function, or, more often, can be programmed to carry out multiple functions, either sequentially or concurrently. A digital signal processor, for example, can execute many different functions such as frequency filtering, gain change, and acoustic effects.

I/0 manager 230 controls the flow of information, symbolized at 206 and 207, with stacks 235 and 236 of control packets each associated with different items of information, or with packages for those items. Each packet, called an 110 request packet (IRP) is an entry in one of the stacks; subsystem 230 executes them at the appropriate times for transporting the data or other information among the attached drivers, programs, and hardware devices. A control packet is like a job order directing a module to perform a specified task upon designated data frames.

Block 240 implements the WDM-CSA subsystem that builds and manages graphs for streaming data. The improved data-flow manager described in the aforementioned patent application Ser. No. 09/310,610 is represented at 241. Block 241 constructs or configures a graph as required for a particular streaming-data application, and causes subsystem 230 to play the graph—that is, to transport data through it—when requested. The individual modules of a graph can comprise any of the devices or programs in FIG. 2, or other types of hardware or software. Block 242 represents the improved control manager of the present invention. This block employs IRPs, sometimes referred to more generically as control packets, for controlling the transport of streaming-data frames through the modules of the graph. Control manager 242 replaces the stacks 235, 236 for controlling streaming data. Although shown as a single block at a particular position in FIG. 2, the functions of manager 242 can be performed in a distributed manner by multiple entities at different levels and locations within the system.

Figure 4A:
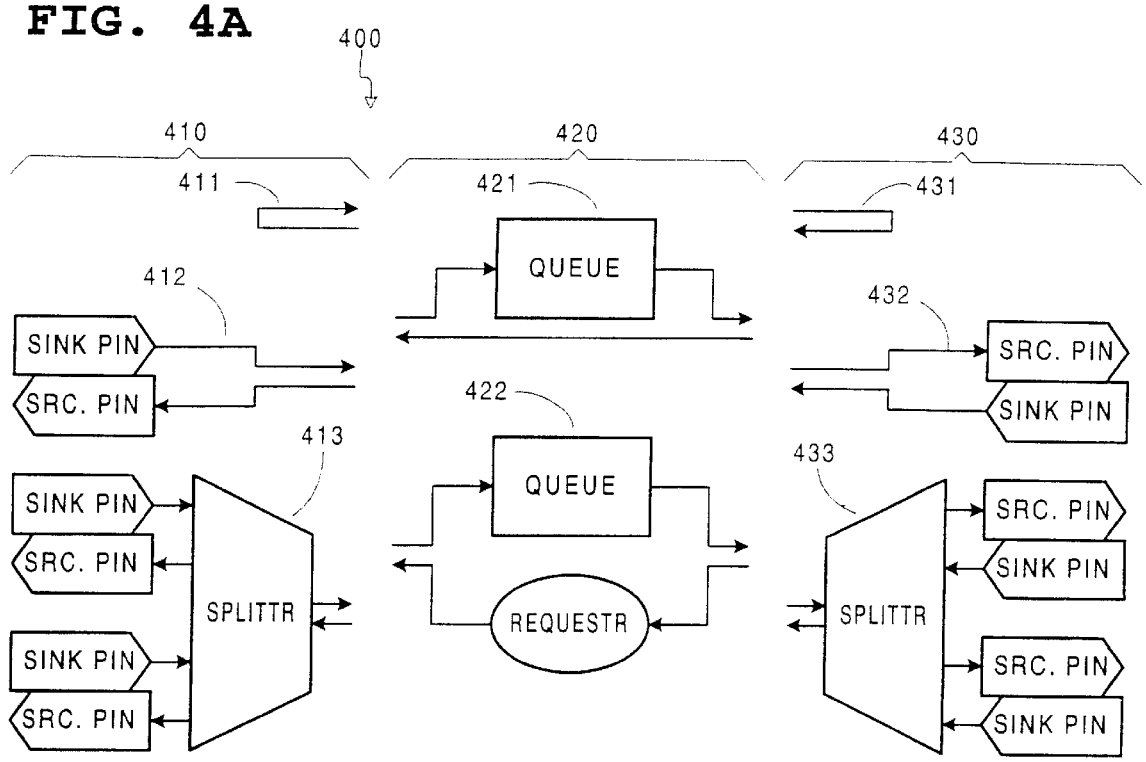
FIGS. 4A and 4B, shows combinations of components according to the invention for implementing control pins of a streaming-data graph.

FIG. 3A is an example of a pipe 300' from a streaming-data graph controlled without benefit of the present invention. A full graph, divided into pipes for enhanced data flow, is depicted in FIG. 4 of patent application Ser. No. 09/310, 610. Pipe 300' has four modules. Data module 310' is included to illustrate the sourcing of streaming data, e.g., from a modem or a disk drive, and stands at the beginning of the pipe. Transform module 320', at the middle of the pipe, demonstrates a function that converts data from one form to another, such as an MPEG decoder. Module 330', shown as a function for rendering video data, stands at the end of the pipe. Heavy arrows 340' symbolize the flow of streaming data from left to right. Filled circles symbolize the data-flow logical connections between adjacent modules in the pipes of a graph Data-source pins 341' inside a pipe transmit data from a module, while data-sink pins 342' receive data.

A group of logical pins implements the control of the data transport in a pipe or graph. The WDM-CSA model requires every control pin of each module to support a communication property having one of a number of types. A source pin such as 321 ' transmits a control packet or IRP along a path 323' to a sink pin such as 311'. This is a control transaction. For example, an IRP from 321' to 311' could request that module 310' fill empty data frames supplied in the request for processing by module 320'. A completed packet, that is, an acknowledgement that a transaction has finished, is returned in the other direction. Four possible combinations of data-flow and communication attributes exist at any module interface: the data-flow might be either in or out, and the pin might either source or sink a control packet. Because the packet acts as a container for its associated data frames, the frames are said to be packaged or wrapped in the packet.

The design of individual modules determines the type of pins that it has at each of its interfaces to other modules in a graph, based upon intended usage, implementation cost, and other factors. Some modules implement other types of control pins. A "both" pin can be either a source or sink of control packets. ("Both" pins can be instantiated as either source or sink pins, but they behave only one way after they are instantiated.) Such pins, however, are difficult to implement and are never implemented in conventional practice. However, sometimes source or sink pins must connect directly to each other in a graph, as at 322' and 331'. A dodge to solve this problem places an artificial converter such as sink/sink module 350' in the graph. This module has no function other than to provide two dummy source nodes 351' and 352' to connect sink nodes 322' and 331' to each other indirectly. Similar source/source converters could conceivably be required in some cases, although most hardware filters expose sink pins, so that in practice source/source converters are not required.

The inflexibility of the module pins adds extra control transactions, slowing the overall data transport through the graph. The control transactions of pipe 300' appear below the modules. Numeral 360' symbolizes one IRP stack, e.g., 206 in FIG. 2. Module 350' allocates one or more data frames. IRP 361' starts at conversion module 350' and performs a transaction 362' en route to module 320' for processing. It performs another transaction 363' from module 320' to 310'. Module 310 fills the frame with data at 364', and returns a completed IRP down the chain to module 320' at 365'. This module returns it at 366' to its point of origin, module 350'. The lack of direct connectibility between sink pins 322' and 331' requires the use of a second IRP stack 370', such as 207 in FIG. 2. IRP 371' from module 350' uses the frames filled in IRP stack 360' and sends them to module 330' in a transaction 372'. Module 330' renders the frames and sends completions back to module 350' at 373'. Therefore, the incompatibility between the control pins of modules 320' and 330' costs an extra module in the graph, an extra control transaction, and the overhead of an additional stack. Equally as important, it also entails an extra frame management and synchronization operations for the data frames controlled by the separate IRP stacks 360' and 370'.

As explained in detail below, the invention facilitates the implementation of pins with the "both" communication type, so that every interface of modules constructed according to the invention is implemented as this type. A single IRP 361 allocates frames at module 330, conveys them in two transactions 362 and 363. Module 310 fills the frames and returns completions 365 and 366. Thus, a first consequence of the invention is to eliminate conversion module 350', stack 370' and operations 371' and 373' in graph 300, FIG. 3A. Just as importantly, a single control packet stack can now manage the entire pipe in a streaming-data graph.

The building blocks of the improved control mechanism are a small set of control components that can be used individually or in combination with each other to implement conventional control functions in a way that permits unnecessary control operations to be eliminated when the modules of a particular pipe of a graph are interconnected with each other. The components hold and transfer control packets. All of the components include a transport facility for moving control packets such as IRPs from one component to another. Every component both receives and sends control packets on this transport. All components further include an interface for establishing connections to other components. While the new control mechanism replaces transactions in any contiguous set of filters that are designed to use it, the pins on the boundaries of this set operate in a conventional manner. Therefore, legacy filters or other devices can still be used in a graph alongside the new mechanism.

The components and their functions are listed in Table 1. The terms "previous component" and "next component" refer to control-mechanism components in the chain of modules connected together in the graph.

TABLE I

| Name | Function |
|---|---|
| Sink pin | Dispatch a control packet to the next component. Complete a packet received from the previous component. |
| Source pin | Receive a control packet from a previous component and send it to the connected conventional pin* via a conventional driver call. Send a completed control packet to the next component. |

TABLE I-continued

| Name | Function |
|---|---|
| Queue | Make a control packet available to a module for filling, modifying, or consuming the frames associated with the packet. Forward the control packet to the next component when the module no longer requires access to the frames (releases them). |
| Requestor | Create a new control packet, associate newly allocated data frames with it, and pass the packet to the next component. Receive a packet from the previous component, and either free it or simply forward it to the next component. |
| Splitter | Receive a control packet from a previous component, and send its associated frames to multiple requestors designated in the splitter. Forward the packet to the next component when all such requestors have returned the frames associated with the packet. |

*That is, the connected pin is one not implemented with the new mechanism. It can be either a sink pin or a "both" pin instantiated to behave as a sink.

Components in this set employ their own transport interface to communicate control packets among each other. This embodiment uses the publicly available Component Object Model (COM) interface, but other protocols are also appropriate.

Source and sink pins are used for communicating with legacy modules that employ only a conventional transport. Although modules using the invention implement these components, they would not be necessary in a world where all modules employ the new mechanism. Transport between two filters implemented using the new invention always bypasses the intervening pin components. In this implementation, source and sink pin components are in fact the same component, operating in two different modes.

A queue, as that term is used herein, implements a function's access to the data frames controlled by a packet as those frames are made available to a module from wherever they are stored. In addition, a queue stores control packets on a first-in first-out basis, so that processing of a packet by a module may occur asynchronously with respect to the arrival of the packet at the queue. In any module, there is a separate queue for every pipe that contains a pin in that module. As explained in application Ser. No. 09/310,610, data frames for an entire pipe are allocated at a designated frame-allocation pin of one of the modules in the pipe. The frames are allocated from and retired to a memory pool managed by that allocator; the data frames are not usually physically copied or transferred within the pipe. However, a control packet permits or denies each module access to those stored frames at particular times. When its queue component receives a packet, the hardware or software of a module can fill its frames with data as in module 310, FIG. 3, modify the data in the packet's frames as in module 320, or remove data from them as at 330.

A requester employs the frame allocator of a pipe to allocate frames of data. A requestor also deallocates frames when they are no longer needed, by means of the allocator facility. In addition, a requestor can recycle completed control packets and their frames in normal operation, bypassing the allocator altogether. This eliminates the overhead of destroying the packet and frame structure and then immediately building a new one for another frame. Instead, a requestor merely forwards packets and their associated frames to the next component.

A splitter handles branches in a pipe. It is possible that a module can output data frames to multiple other modules within the same pipe; FIG. 4 of Application Ser. No. 09/310,610 shows an example of a three-way split. Like the other types of components, a splitter receives and sends control packets. A splitter also has one or more branch subcomponents, each of which behaves somewhat like a requester. When a splitter receives a frame, the frame is distributed to the branch subcomponents, each of which sends the frame to the next component in its subgraph. This generally happens concurrently, each branch sending the frame wrapped in a separate IRP. When all the IRPs corresponding to the frame return to their respective branch subcomponents, the splitter forwards the original IRP to its next component. Depending upon the particular filter, a frame might be sent to some subset of the branches rather than to all of them. Another variation includes dividing a frame into partial frames or subframes, and sending different parts to different ones of the branches. Also, frames or subframes could be sent down the different branches sequentially instead of concurrently.

A splitter component handles branches in both directions of data flow. Where pipe branches merge in a graph to form a data mixer, the splitter receives an empty frame and sends it to all the branches. The branches send out the empty frame (or subframes) to be filled by other components. The difference between the two data-flow directions is that, when the data diverges from a single branch to multiple branches, the splitter receives a full frame and distributes it to the branches for consumption by other components; but, when the data converges from multiple branches to a single branch, the branches send out an empty frame for filling by other components.

FIG. 4 shows combinations 400 of the components of Table I for implementing streaming-graph control pins in the new mechanism. One way to convert streaming-data control flow is to conceptualize each module of the graph as having an input section 410, a processing section 420, and an output section 430 that can be connected together for control purposes in different ways. FIG. 4 assumes data flow from left to right.

The input section 410 of a module can have zero, one, or multiple pins. If the input has no pins, it receives no control inputs. Therefore, a simple internal loopback 411 accepts control packets and returns them immediately, without leaving the module. If the module has a single pin, the combination 412 of a sink-pin component and a source-pin component receives control packets from a previous module and send packets to this module. (In the new mechanism, all control pins are assumed to be "both" pins, and are therefore implemented with both a source-pin component and a sink-pin component.) If the module has more than one pin in its input section, then component combination 413 provides a number of source/sink pin components feeding a splitter component. The number of input pins can vary. Splitters can also be used to implement a single input pin if desired for certain data-expansion situations.

The center or processing section 420 of a module can have a combination 421 of a queue component for passing data frames to and/or from a processing function in the module, and a direct path for returning packets in the opposite direction. This is the normal case. If the module is also assigned an allocator, combination 422 adds a requester component to the right-to-left control path. [??]

The output section 430 mirrors the input section. Combination 431 is a loopback for use where a module has no output pins. Source/sink pin combination 432 implements a single output pin. Combination 433 feeds packets through a splitter to a variable multiplicity of source/sink pins.

Figure 4B:
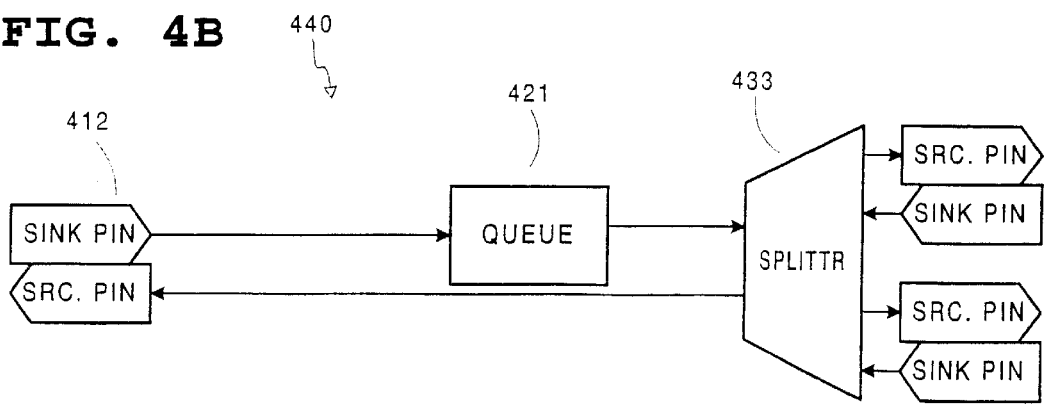

The control mechanism of an entire module in a streaming graph is realized by coupling appropriate ones of the combinations together. One of the combinations in the input sections is coupled to one of the combinations in the processing section, and then to one in the output section, depending upon the number of control pins and the internal function of a particular module, as described above. If the module has input pins, each input sink pin bears a packet that wrap a filled data frame to the queue. If there are output source pins, each one receives a packet for a filled frame from the queue. All other flows bear empty frames. FIG. 4B illustrates a control-flow implementation 440 of a module having one input pin, no memory allocator, and two output pins. The pins of input combination 412 couple to the queue of processing combination 422, which in turn couple to the splitter of output combination 433, and thence to the two output control pins of the module. In the reverse direction, the splitter connects directly to the input source pin. That is, the appropriate combinations of components are merged into a single larger combination for implementing the control flow for the entire module. Other ways of conceptualizing this process are also possible.

FIG. 5A shows the illustrative pipe 300 from FIG. 3, with its control flow implemented in the new mechanism. Data-input module 310 has no input control pin, no allocator, and a single output pin 311. Therefore, its control combination has a loopback 411, a queue 421, and a source/sink pin pair 432, using the designations of FIG. 4. Transform module has an input pin 321, no allocator, and output pin 322. Its control combination uses a pin pairs 412 and 432, coupled via a processing queue 421. Data-output module has a single input pin and an allocator, but no output pin. Its control suite includes a pin pair 412, a queue/requestor combination, and a loopback 431. The single overall control stack 360 is reproduced in FIG. 5A.

The next step is to merge adjacent modules into an overall control flow for the pipe. This is done by removing input and output pins that are connected directly to each other. These components are now redundant. In FIG. 5B, a single logical control line 501 now directly links the queue of module 330 to the queue of module 320. Logical line 502 links that queue to the queue of module 310. Line 503 returns to the requestor of block 330 to close the path. In the described embodiment, a requestor can reside in any module of a pipe except in a branch of a splitter. A complete streaming graph can—and usually does—have more than one pipe. Control flow of the packets in this example opposes the left-to-right data flow of the frames; it is possible for data and control to flow in opposite directions or in the same direction within a pipe, and in different directions in different pipes.

The prior-art control scheme described in connection with the simple illustrative pipe of FIG. 3A handles a control packet six times, in three forward and three completion transactions. It requires two separate stacks and their attendant overhead. The new control mechanism first reduces this to four transactions and a single stack as shown in FIGS. 3B and 5A, then further reduces the transactions to three in FIG. 5B. Moreover, the new mechanism is compatible with legacy modules that only understand conventional control protocols, because they can still communicate with the new source-pin and sink-pin components.

Figure 6:
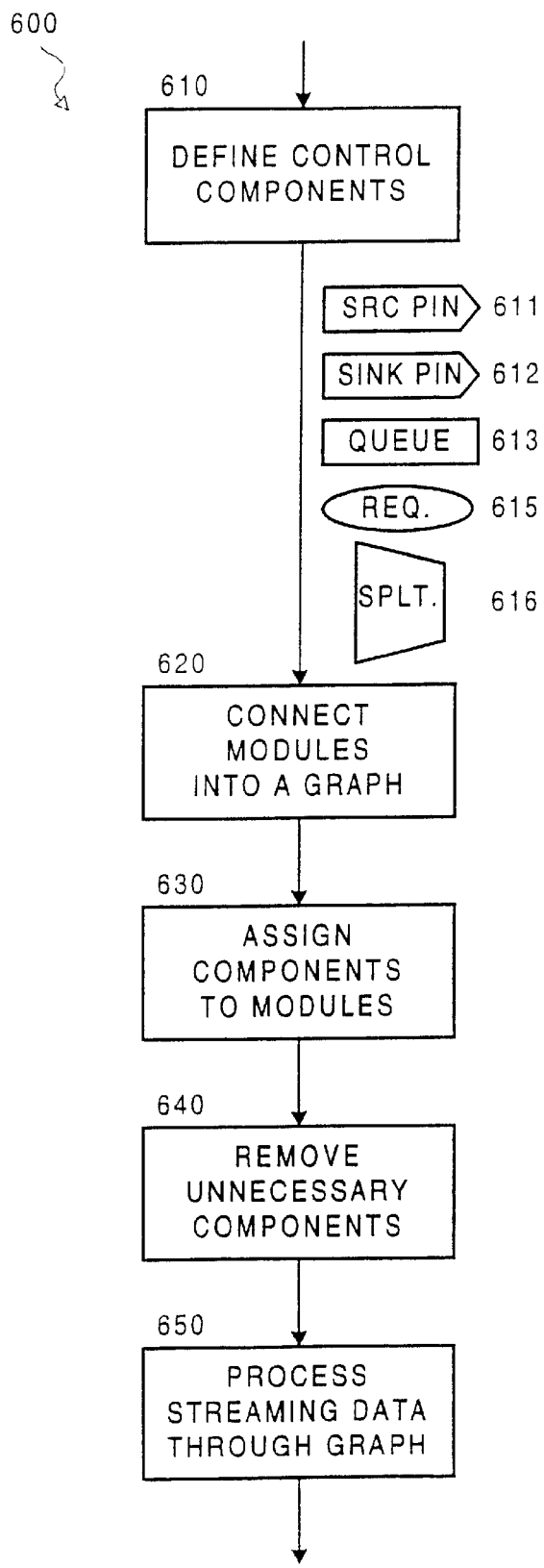
FIG. 6 is a flowchart of processes for carrying out the invention.

FIG. 6 is a flowchart 600 of an entire method for creating and using control mechanisms for streaming-data in a computer or similar system. The method can be implemented wholly or partly in software, hardware, or any other convenient form. The order of describing the steps of the method do not imply any time sequence. @@@@@

In block 610, a designer defines the components of the mechanism. The components perform elementary control functions at a low level. The set must be capable of performing all operations required for overall control of streaming data in whatever structure is selected for building graphs. Components 611–616 represent a good mix of simplicity, power, and ease of implementation. In a system that does not need branching pipes in graphs, splitter 616 would not be required. Although the described components fully address control-transport needs, it might be possible that additional components might be desirable in some future situations. Each of the components in the set has the capability of receiving control packets from another component, and for sending a packet to another component on a defined transport. At least some of the components perform other operations as well. For example, a requestor associates certain frames with a control packet by placing a designation of the frames into the packet, and a queue produces an indication that frame data is to be read or written, or that it is accessible to particular code or hardware.

Block 620 builds a graph such as 300. The configuration of a particular graph depends upon the requirements of the data that will stream through it. The WDM-CSA subsystem performs this task from instructions given by an application program or other instrumentality. Facilities described in application Ser. No. 09/310,610 can divide the graph into one or more pipes for improving its data flow.

Block 630 causes control manager 242, FIG. 2, to determine the control functions that must be performed by the control pins of every module in a pipe or other unit of the graph, and to select a combination of the control components capable of carrying out that function at that particular point in the graph. That is, the selected combination depends not only upon the operation, but upon the module's configuration of control pins in the graph.

Block 640 removes unnecessary control components from the structure of the particular graph. Control manager 242 investigates the entire control organization of the pipe or other graph unit, excises any components that perform no useful work, and reconnects the remaining control components to each other directly. Although this embodiment removes only redundant adjacent functions, it might be possible to perform other simplifications and/or reconfigurations as well. Although block 630 respects module boundaries in selecting component combinations, block 640 ranges over the entire graph unit without regard to where a module might begin or end. The resulting control structure improves the overall performance of the graph, rather than optimizing each module separately.

In block 650, an application or other hardware or software device sends streaming data to the graph. WDM-CSA or a similar subsystem processes it through the graph to a destination such as a storage, communication, or presentation device. The control structure built up in blocks 630 and 640 wrap data frames in control packets that tell each module in the graph what to do with the data in the frames, and when to do it, by passing through the control components 611–616 that have been placed in the graph and reconnected for greater efficiency and speed.

Conclusion

The above description presents examples of particular control mechanisms and methods for improving the control of streaming data through multiple processing modules connected in a graph that can be reconfigured for handling different data and for executing different overall operations. Modifications within the concept of the invention will appear to those skilled in the art. Although the Microsoft Windows operating systems and the WDM-CSA and COM facilities provide a convenient environment for the described embodiments, many other systems are amenable for hosting the invention. Also, as specifically mentioned above, it is possible to add to, subtract from, and modify the specific items in the described set of control components, and to employ control packets other than stack-based IRPs. In the described methods, the description of operations and steps in a particular sequence does not imply that such they must be performed in any specific time order.

We claim:

1. A method for instantiating a graph that controls streaming data flowing through multiple modules in frames wrapped in control packets, comprising:

connecting control pins of modules over a first control packet transport to form a desired control packet transport graph to accomplish an overall function on the streaming data, where at least a pair of the control pins each comprises a combination of removable control components and where the combination of removable control components provides a function for processing the streaming data; and modifying the desired control packet transport graph by bypassing at least a pair of connected control pins each comprising a combination of removable control components and directly connecting the associated combinations of control components over a second control packet transport.

2. The method of claim 1 where the removable control components comprise:

a sink pin control component for completing control packets received from a connected component, and for dispatching control packets to a connected component;

a source pin control component for sending a control packet received from a connected component to a connected control pin, and for sending completed control packets to a connected control component;

a requester control component for allocating control packets to particular frames and for passing the allocated frames to a connected control component; and a queue control component assignable to a pipe associated with a filter for processing frames wrapped in an control packet, and for forwarding the control packet, to a connected control component when the filter no longer requires the frames wrapped in the control packet.

3. The method of claim 2 where the requestor further deallocates control packets from the particular frames.

4. The method of claim 2 where the requestor further recycles frames by allocating them to different ones of the frames.

5. The method of claim 2 where the control components further comprise a splitter control component for forwarding a received packet to multiple requestor control components.

6. The method of claim 2 where the splitter control component forwards its received packet to another control component when all of the multiple requestor control components have returned the frames associated with the packet.

7. The method of claim 2 where at least one of the control components transfers control packets using two different control packet transports.

8. The method of claim 7 where one of the control components receives control packets from a connected control component on the first control packet transport, and forwards it to another connected component on the second control packet transport.

9. The method of claim 2 where one of the combinations includes a source pin control component, a requestor control component, and a queue control component.

10. The method of claim 2 where one of the combinations includes a sink pin control component, a requestor control component, and a queue control component.

11. The method of claim 2 where one of the combinations includes a source pin control component, a queue control component, and a sink pin control component.

12. The method of claim 2 where one of the combinations includes a queue control component and a source pin control component.

13. The method of claim 2 where one of the combinations includes a queue control component and a sink pin control component.

14. The method of claim 2 where, after removing the redundant control component pairs, no source-pin control components and no sink-pin control components remain in the graph.

15. A computer-readable medium capable of presenting instructions and data for causing a digital computer to execute the method of claim 1.

16. The method of claim 1, further comprising modifying the desired control packet transport graph by removing redundant control components connected over the second control packet transport.

17. A method for instantiating a graph controlling streaming data in a computer, comprising:

selecting a plurality of modules each having software control pins that expose one or more functions within the module for processing the streaming data, at least a pair of the software control pins comprising one or more control components which implement the functions;

assembling the selected modules into a high-level graph by connecting together the software control pins of the modules;

assembling a more fine-grained graph by replacing high-level control pin connections with direct control component connections where the control pins comprise one or more control components;

determining that at least some of the control components in the fine-grained graph are redundant; and bypassing the redundant control components.

18. The method of claim 17 where the redundant control components are associated with adjacent modules in the graph.

19. The method of claim 17 where the graph comprises a plurality of pipes, and where the redundant control components are removed only within the pipes.

20. The method of claim 19 where each pipe has an allocator for providing data frames to all modules of that pipe.

21. The method of claim 17 where the control components employ a first control packet transport among themselves that differs from a control packet transport employed between the control pins.

22. The method of claim 17 where the control components comprise:

a sink pin control component for completing control packets received from a connected control component, and for dispatching control packets to a connected control component;

a source pin control component for sending a control packet received from a connected control component to a connected control pin, and for sending completed control packets to a connected control component;

a requester control component for allocating control packets to particular frames and for passing the allocated frames to a connected control component; and a queue control component assignable to a pipe associated with a filter for processing frames wrapped in an control packet, and for forwarding the control packet to a connected control component when the filter no longer requires the frames wrapped in the control packet.

23. A computer-readable medium capable of presenting instructions and data for causing a digital computer to execute the method of claim 17.

24. The method of claim 17, further comprising removing the redundant control components.

25. A mechanism for a controlling streaming data packaged in frames wrapped in control packets and flowing through filters connected by one or more pipes in a graph, the mechanism comprising a control pin, the control pin comprised of a minimal combination of a set of control components required to perform the control pin's one or more functions as determined by the control pin's location in a control packet graph, the set of control components comprising:

a sink pin control component for completing control packets received from a connected control component, and for dispatching control packets to a connected control component;

a source pin control component for sending a control packet received from a connected control component to a connected control pin, and for sending completed control packets to a connected control component;

a requestor control component for allocating control packets to particular frames and for passing the allocated frames to a connected control component; and a queue control component assignable to a pipe associated with a filter for processing frames wrapped in a control packet, and for forwarding the control packet to a connected control component when the filter no longer requires the frames wrapped in the control packet.

26. The mechanism of claim 25, the set of control components further comprising:

a splitter control component for sending the frames wrapped in a control packet to designated multiple requestor control components.

27. The mechanism of claim 26 where the splitter control component also forwards the control packet to a connected control component when all the designated requestor control components have returned the frames wrapped in the control packet.

28. The mechanism of claim 25 where the requestor control component further deallocates control packets from the particular frames.

29. The mechanism of claim 28 where the requestor control component recycles frames from one control packet to another.

30. The mechanism of claim 25 where processing frames includes filling at least one frame with data.

31. The mechanism of claim 25 where processing frames includes removing data from at least one frame.

32. The mechanism of claim 25 where processing frames includes modifying the data in at least one frame.

33. A system for controlling the flow of streaming data, comprising:
- a set of control components;
- a plurality of modules for processing the streaming data, each module having a plurality of control pins for interfacing to others of the modules, at least a pair of the control pins comprising a combination of the control components;
- a streaming-data manager for connecting certain of the modules for performing a desired overall function, for instantiating a control packet graph by connecting the control pins of those modules to each other, and for optimizing the control packet graph by removing at least some of the control components from the connected modules.

34. The system of claim 33 where the removed components are disposed in adjacent ones of the connected modules.

35. The system of claim 33 where the control components comprise:
- a sink pin control component for completing control packets received from a connected control component, and for dispatching control packets to a connected component;
- a source pin control component for sending a control packet received from a connected control component to a connected control pin, and for sending completed control packets to a connected control component;
- a requestor control component for allocating control packets to particular frames and for passing the allocated frames to a connected control component; and
- a queue control component assignable to a pipe associated with a filter for processing frames wrapped in an control packet, and for forwarding the control packet to a connected control component when the filter no longer requires the frames wrapped in the control packet.

36. A computer-readable medium having computer-executable instructions for instantiating a graph that controls streaming data flowing through multiple modules in frames wrapped in control packets, the instructions comprising:
- connecting control pins of modules over a first control packet transport to form a desired control packet transport graph to accomplish an overall function on the streaming data, where at least a pair of the control pins each comprises a combination of removable control components and where the combination of removable control components provides a function for processing the streaming data; and
- modifying the desired control packet transport graph by bypassing at least a pair of connected control pins each comprising a combination of removable control components and directly connecting the associated combinations of control components over a second control packet transport.

37. A computer-readable medium having computer-executable instructions for instantiating a graph controlling streaming data in a computer, the instructions comprising:
- selecting a plurality of modules each having software control pins that expose one or more functions within the module for processing the streaming data, at least a pair of the software control pins comprising one or more control components which implement the functions;
- assembling the selected modules into a high-level graph by connecting together the software control pins of the modules;
- assembling a more fine-grained graph by replacing high-level control pin connections with direct control component connections where the control pins comprise one or more control components;
- determining that at least some of the control components in the fine-grained graph are redundant; and
- bypassing the redundant control components.

* * * * *

UNITED STATES PATENT AND TRADEMARK OFFICE
CERTIFICATE OF CORRECTION

PATENT NO. : 6,658,477 B1
DATED : December 2, 2003
INVENTOR(S) : Lisitsa et al.

It is certified that error appears in the above-identified patent and that said Letters Patent is hereby corrected as shown below:

Title page,
Item [57], ABSTRACT,
Line 8, "requester" should read -- requestor --.

Column 6,
Line 30, "graph Data-source" should read -- graph. Data-source --.

Column 9,
Line 6, "requester" should read -- requestor --.

Column 13,
Line 20, "source-pin" should read -- source pin --.
Line 21, "sink-pin" should read -- sink pin --.

Column 14,
Line 5, "requester" should read -- requestor --.

Signed and Sealed this

Twenty-seventh Day of July, 2004

JON W. DUDAS
*Acting Director of the United States Patent and Trademark Office*